(12) United States Patent  
Liu et al.

(10) Patent No.: US 11,850,746 B2  
(45) Date of Patent: Dec. 26, 2023

(54) PLANAR ARTICULATED ROBOT AND INNER ROTOR JOINT DEVICE

(71) Applicant: SOOCHOW UNIVERSITY, Suzhou (CN)

(72) Inventors: Jizhu Liu, Suzhou (CN); Mingqiang Pan, Suzhou (CN); Xiaoqi Zhang, Suzhou (CN); Yangjun Wang, Suzhou (CN); Ziwu Ren, Suzhou (CN); Haibo Huang, Suzhou (CN)

(73) Assignee: SOOCHOW UNIVERSITY, Suzhou (CN)

( * ) Notice: Subject to any disclaimer, the term of this patent is extended or adjusted under 35 U.S.C. 154(b) by 726 days.

(21) Appl. No.: 17/033,893

(22) Filed: Sep. 27, 2020

(65) Prior Publication Data

US 2021/0023700 A1   Jan. 28, 2021

Related U.S. Application Data

(63) Continuation of application No. PCT/CN2019/090577, filed on Jun. 10, 2019.

(30) Foreign Application Priority Data

May 30, 2019 (CN) .......................... 201910465079.8

(51) Int. Cl.
- *B25J 9/12* (2006.01)
- *B25J 9/04* (2006.01)
- *H02K 16/02* (2006.01)

(52) U.S. Cl.
CPC ............... *B25J 9/126* (2013.01); *B25J 9/042* (2013.01); *H02K 16/02* (2013.01); *B25J 9/044* (2013.01); *H02K 2213/03* (2013.01)

(58) Field of Classification Search
CPC ...................................................... B25J 9/126
See application file for complete search history.

(56) References Cited

U.S. PATENT DOCUMENTS

| 8,446,060 | B1 | 5/2013 | Lugg | |
| 2012/0286629 | A1* | 11/2012 | Johnson | H02K 29/08 310/68 B |

(Continued)

FOREIGN PATENT DOCUMENTS

| CN | 103635716 A | 3/2014 |
| CN | 106826801 A | 6/2017 |

(Continued)

*Primary Examiner* — Bernard Rojas  
(74) *Attorney, Agent, or Firm* — SZDC Law PC (57) ABSTRACT

The present invention discloses a planar articulated robot and an inner rotor joint device, including a base, a first inner rotor joint device provided on the base, a first mechanical arm driven by the first inner rotor joint device, and a manipulator connected to the first mechanical arm, wherein the first inner rotor joint device comprises a rotating shaft fixedly connected to the first mechanical arm and extending along a longitudinal axis, a low-speed rotor assembly located on an outer periphery of the rotating shaft, a high-speed rotor assembly located on an outer periphery of the low-speed rotor assembly, a magnetizing ring located between the low-speed rotor assembly and the high-speed rotor assembly in a circumferential direction, a stator core located on an outer periphery of the high-speed rotor assembly with a certain gap therebetween in the circumferential direction, and a casing covering an outer periphery of the stator core and fixedly connected to the stator core, and a coil is wound around the stator core. The present invention enables high transmission precision, high utilization rate of permanent magnets, simple and compact structure, and low cost.

10 Claims, 7 Drawing Sheets

(56) References Cited

U.S. PATENT DOCUMENTS

| | | | | |
|---|---|---|---|---|
| 2014/0167546 A1* | 6/2014 | Sutani | ............... | H02K 49/102 |
| | | | | 310/103 |
| 2018/0062490 A1* | 3/2018 | Knight | ............... | H02K 17/32 |
| 2020/0212763 A1* | 7/2020 | Takata | ............... | A61B 34/30 |
| 2021/0299859 A1* | 9/2021 | Okita | ............... | H02K 21/22 |

FOREIGN PATENT DOCUMENTS

| | | |
|---|---|---|
| CN | 106899194 A | 6/2017 |
| CN | 208880763 U | 5/2019 |

* cited by examiner

PLANAR ARTICULATED ROBOT AND INNER ROTOR JOINT DEVICE

This application is a Continuation Application PCT/CN2019/090577, filed on Jun. 10, 2019, which claims priority to Chinese Patent Application No. 201910465079.8, filed on May 30, 2019, which is incorporated by reference for all purposes as if fully set forth herein.

TECHNICAL FIELD

The present invention relates to a planar articulated robot and an inner rotor joint device.

BACKGROUND

With the rapid development of IC, semiconductor, and 3C industries, modern automated factories continue to upgrade, industrial robots will be more widely used in various fields of manufacturing, and the requirements for robots in the field of precision assembly are becoming higher and higher. Traditional SCARA robots are difficult to meet the needs of robot speed and accuracy in assembly operations, and there is an urgent need to improve robot performance. The arm joints of the existing planar articulated robot are connected by a harmonic reducer or RV reducer, and a servo motor drives the reducer to achieve the purpose of quickly driving the mechanical arm. However, because the harmonic reducer or RV reducer is used, and there is backlash between the meshing teeth in the reducer, there will be unavoidable errors in the arm operation of the planar articulated robot, which will affect the assembly accuracy and the torque density is relatively small.

SUMMARY

The objects of the present invention are to provide a planar articulated robot and an inner rotor joint device, so that the transmission accuracy is high, the permanent magnet utilization is high, the structure is simple and compact, and the cost is low.

To achieve one of the above objects of the present invention, an embodiment of the present invention provides a planar articulated robot including a base, a first inner rotor joint device provided on the base, a first mechanical arm driven by the first inner rotor joint device, and a manipulator connected to the first mechanical arm, wherein the first inner rotor joint device comprises a rotating shaft fixedly connected to the first mechanical arm and extending along a longitudinal axis, a low-speed rotor assembly located on an outer periphery of the rotating shaft, a high-speed rotor assembly located on an outer periphery of the low-speed rotor assembly, a magnetizing ring located between the low-speed rotor assembly and the high-speed rotor assembly in a circumferential direction, a stator core located on an outer periphery of the high-speed rotor assembly with a certain gap therebetween in the circumferential direction, and a casing covering an outer periphery of the stator core and fixedly connected to the stator core, and a coil is wound around the stator core.

As a further improvement of an embodiment of the present invention, the magnetizing ring includes a magnetizing block skeleton and a plurality of magnetizing blocks uniformly arranged on the magnetizing block skeleton in the circumferential direction, the magnetizing block is made of a magnetically conductive material, and the magnetizing block skeleton is made of a non-magnetically conductive material.

As a further improvement of an embodiment of the present invention, the low-speed rotor assembly includes a low-speed rotor yoke stationary relative to the rotating shaft and low-speed rotor magnet N poles and low-speed rotor magnet S poles fixed on an outer periphery of the low-speed rotor yoke, the low-speed rotor magnet N poles and the low-speed rotor magnet S poles are alternately arranged in the circumferential direction, the high-speed rotor assembly comprises a high-speed rotor yoke and high-speed rotor magnet N poles and high-speed rotor magnet S poles fixed on an inner ring of the high-speed rotor yoke, motor magnet N poles and motor magnet S poles are provided on an outer ring of the high-speed rotor yoke, the high-speed rotor magnet N poles and the high-speed rotor magnet S poles are alternately arranged in the circumferential direction, and the motor magnet N poles and the motor magnet S poles are alternately arranged in the circumferential direction.

As a further improvement of an embodiment of the present invention, the high-speed rotor magnet N poles and the high-speed rotor magnet S poles are arranged as $N_1$ pairs, the low-speed rotor magnet N poles and the low-speed rotor magnet S poles are arranged as $N_2$ pairs, and the magnetizing blocks are arranged as $N_3$ blocks, where $N_3 = N_1 + N_2$.

As a further improvement of an embodiment of the present invention, a rotation speed of the high-speed rotor yoke is $\omega_1$ and a rotation speed of the low-speed rotor yoke is $\omega_2$, then $$\frac{\omega_1}{\omega_2} = -\frac{N_2}{N_1}.$$

As a further improvement of an embodiment of the present invention, a torque of the high-speed rotor yoke is $T_1$ and a torque of the low-speed rotor yoke is $T_2$, then $$\frac{|T_1|}{|T_2|} = \frac{N_1}{N_2}.$$

As a further improvement of an embodiment of the present invention, the high-speed rotor magnet N poles and the high-speed rotor magnet S poles, the magnetizing blocks, the low-speed rotor magnet N poles and the low-speed rotor magnet S poles have a certain gap with each other in a direction perpendicular to the longitudinal axis, and are arranged to be evenly distributed in the circumferential direction.

As a further improvement of an embodiment of the present invention, two ends of the high-speed rotor magnet N poles and the high-speed rotor magnet S poles, the magnetizing blocks, the low-speed rotor magnet N poles and the low-speed rotor magnet S poles in the direction of the longitudinal axis are arranged to be flush with each other.

As a further improvement of an embodiment of the present invention, the planar articulated robot further includes a second mechanical arm disposed between the first mechanical arm and the manipulator and a second inner rotor joint device driving the second mechanical arm to rotate, wherein the second inner rotor joint device is the same as the first inner rotor joint device.

As a further improvement of an embodiment of the present invention, the first inner rotor joint device further comprises a lower end cover and an upper end cover provided at two opposite ends of the casing in an extending direction of the longitudinal axis, the lower end cover and the upper end cover are fixedly connected to the casing, the lower end cover and the upper end cover define a receiving cavity, and the low-speed rotor assembly, the high-speed rotor assembly, the magnetizing ring and the stator core are all received in the receiving cavity.

As a further improvement of an embodiment of the present invention, a lower bearing is provided between the lower end cover and the rotating shaft, and an upper bearing is provided between the upper end cover and the rotating shaft.

As a further improvement of an embodiment of the present invention, the first inner rotor joint device further comprises a grating sheet fixedly connected to the rotating shaft and an encoder fixedly connected to the upper end cover, the encoder faces the grating sheet, the grating sheet is located on the entire periphery of the rotating shaft, and the grating sheet is coaxial with the rotating shaft.

As a further improvement of an embodiment of the present invention, the first inner rotor joint device further comprises an encoder housing fixed to the upper end cover, the encoder housing and the casing are located on two sides of the upper end cover, and the encoder housing and the upper end cover define a housing space for housing the grating sheet and the encoder.

To achieve one of the above objects of the present invention, an embodiment of the present invention also provides an inner rotor joint device including a rotating shaft extending along a longitudinal axis, a low-speed rotor assembly located on an outer periphery of the rotating shaft, a high-speed rotor assembly located on an outer periphery of the low-speed rotor assembly, a magnetizing ring located between the low-speed rotor assembly and the high-speed rotor assembly in a circumferential direction, a stator core located on an outer periphery of the high-speed rotor assembly with a certain gap therebetween in the circumferential direction, and a casing covering an outer periphery of the stator core and fixedly connected to the stator core, and a coil is wound on the stator core.

As a further improvement of an embodiment of the present invention, the magnetizing ring comprises a magnetizing block skeleton and a plurality of magnetizing blocks uniformly arranged on the magnetizing block skeleton in the circumferential direction, the magnetizing block is made of a magnetically conductive material, and the magnetizing block skeleton is made of a non-magnetically conductive material.

As a further improvement of an embodiment of the present invention, the low-speed rotor assembly comprises a low-speed rotor yoke stationary relative to the rotating shaft and low-speed rotor magnet N poles and low-speed rotor magnet S poles fixed on an outer periphery of the low-speed rotor yoke, the low-speed rotor magnet N poles and the low-speed rotor magnet S poles are alternately arranged in the circumferential direction, the high-speed rotor assembly comprises a high-speed rotor yoke and high-speed rotor magnet N poles and high-speed rotor magnet S poles fixed on an inner ring of the high-speed rotor yoke, motor magnet N poles and motor magnet S poles are provided on an outer ring of the high-speed rotor yoke, the high-speed rotor magnet N poles and the high-speed rotor magnet S poles are alternately arranged in the circumferential direction, and the motor magnet N poles and the motor magnet S poles are alternately arranged in the circumferential direction.

The beneficial effect of the present invention is that in the technical solution adopted by the present invention, a magnetizing ring is provided between a low-speed rotor assembly and a high-speed rotor assembly in a circumferential direction to adjust magnetic fields generated by the low-speed rotor assembly and the high-speed rotor assembly and generate spatial harmonics to realize the transmission of torque and speed, resulting in high transmission accuracy and high utilization rate of permanent magnets. In addition, the high-speed rotor assembly outputs a lower torque. After conversion, the low-speed rotor assembly can obtain a higher torque. Therefore, the volume of the high-speed rotor assembly can be greatly reduced, which further makes the structure simple and compact, and the cost is low.

BRIEF DESCRIPTION OF THE DRAWINGS

In order to more clearly explain the technical solutions in the embodiments of the present invention or in the prior art, the drawings required in the description of the embodiments or the prior art will be described briefly in the following. Obviously, the drawings in the following description are only some of the embodiments described in the present invention. For those skilled in the art, without paying any creative work, other drawings can also be obtained based on these drawings.

DETAILED DESCRIPTION

In order to enable those skilled in the art to better understand the technical solutions in the present invention, the technical solutions in the embodiments of the present invention will be described clearly and completely in conjunction with the drawings in the embodiments of the present invention. Obviously, the described embodiments are only a part of the embodiments of the present invention, but not all the embodiments. Based on the embodiments of the present invention, all other embodiments obtained by those skilled in the art without creative work shall fall within the scope of protection of the present invention.

In the description of specific embodiments of the present invention, the orientation or positional relationships indicated by the terms "upper", "lower", "front", "rear", "left", "right", "vertical", "horizontal", "bottom", "inner" and "outer" are based on the orientation or positional relationships shown in the drawings, usually referring to the normal use state of a planar articulated robot, not the indication that the position or element must have a specific orientation.

Figure 1:
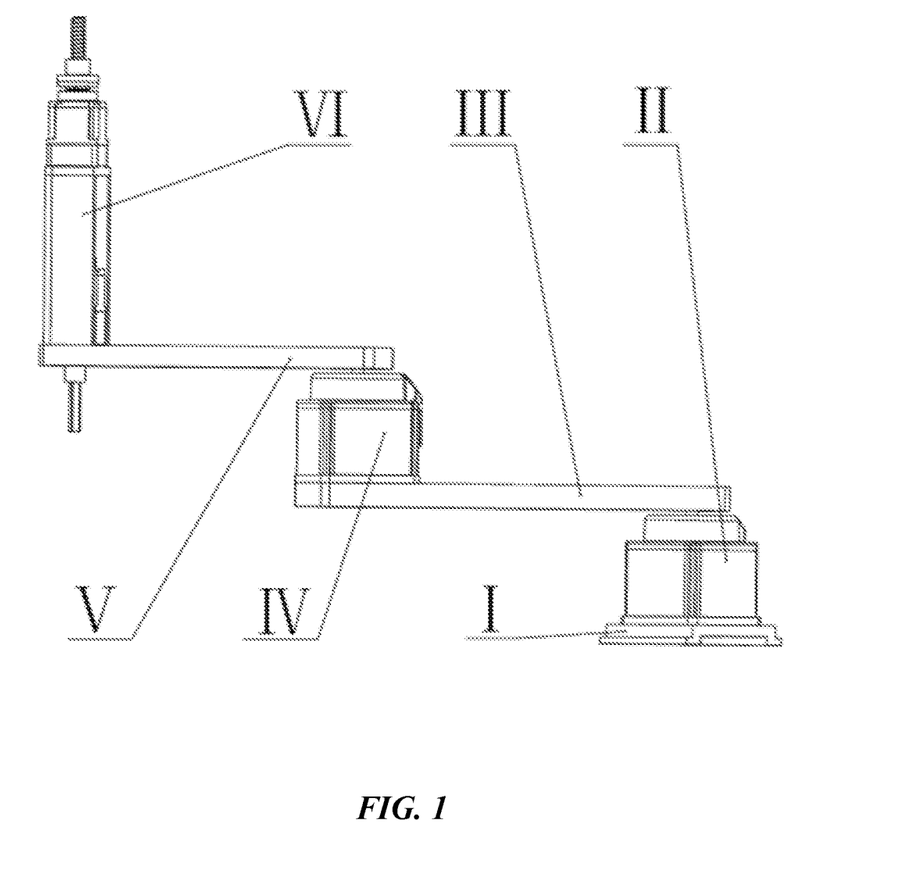
FIG. 1 is a front view of a planar articulated robot according to an embodiment of the present invention.
Figure 2:
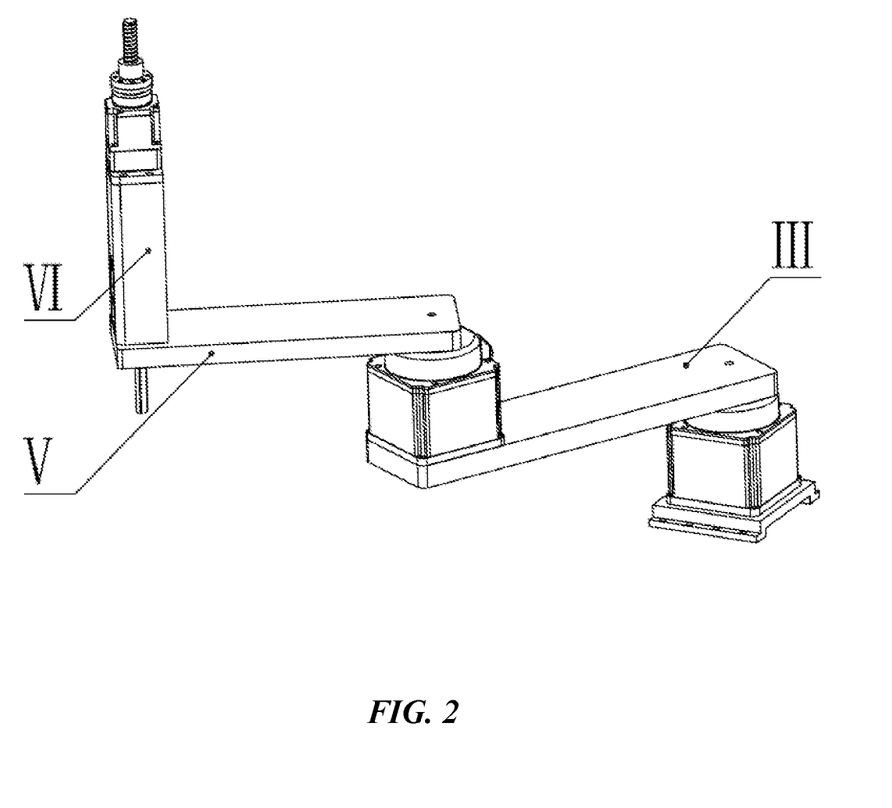
FIG. 2 is a perspective view of the planar articulated robot according to an embodiment of the present invention.

Referring to FIGS. 1 and 2, a specific embodiment of the present invention provides a planar articulated robot including a base I, a first inner rotor joint device II provided on the base I, and a first mechanical arm III driven by the first inner rotor joint device II, and a manipulator VI connected to the first mechanical arm III.

Further, the planar articulated robot further includes a second mechanical arm V disposed between the first mechanical arm III and the manipulator VI and a second inner rotor joint device IV that drives the second mechanical arm V to rotate. In this preferred embodiment, the second inner rotor joint device IV is the same as the first inner rotor joint device II. Of course, the second inner rotor joint device IV may also be different from the first inner rotor joint device II. Only the first inner rotor joint device II will be described in detail below, and the second inner rotor joint device IV will not be specifically explained.

The first inner rotor joint device II is a magnetic gear compound motor. The first inner rotor joint device II includes a rotating shaft 13 fixedly connected to the first mechanical arm III and extending along a longitudinal axis, a magnetic gear module located on an outer periphery of the rotating shaft 13, and a motor module located on an outer periphery of the magnetic gear module.

The installation of the overall structure will be described now. After the assembly of the first inner rotor joint device II, the second inner rotor joint device IV, and the manipulator VI is completed, final assembly is performed. The first inner rotor joint device II is connected to the base I by bolts. The first mechanical arm III is connected to the rotating shaft 13 of the first inner rotor joint device II by bolts. The second inner rotor joint device IV is connected to the first mechanical arm III by bolts. The second mechanical arm V is connected to a rotating shaft of the second inner rotor joint device IV by bolts. The second mechanical arm V rotates together with the rotating shaft of the second inner rotor joint device IV. The manipulator VI is fixed to the second mechanical arm V by bolts.

Figure 3:
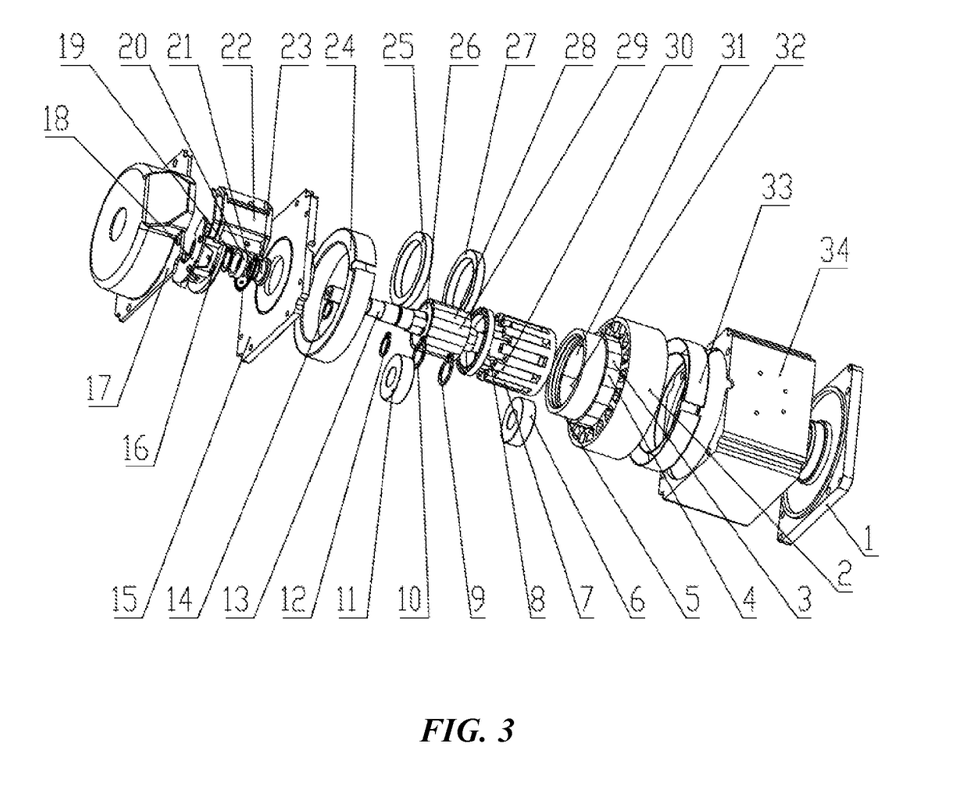
FIG. 3 is an exploded perspective view of a first inner rotor joint device in FIG. 1.
Figure 4:
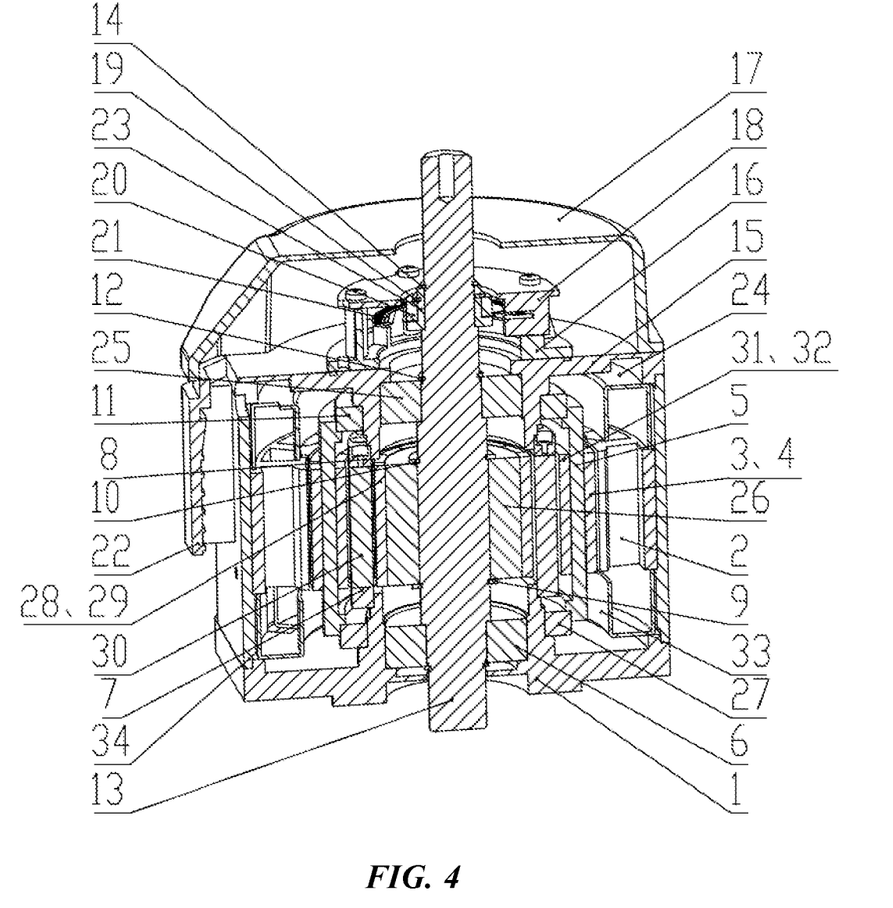
FIG. 4 is a lateral cross-sectional view of the first inner rotor joint device in FIG. 3.

Further referring to FIGS. 3 to 4, the magnetic gear module includes a low-speed rotor assembly located on an outer periphery of the rotating shaft 13, a high-speed rotor assembly located on an outer periphery of the low-speed rotor assembly, and a magnetizing ring located between the low-speed rotor assembly and the high-speed rotor assembly in a circumferential direction. The motor module includes a stator core 2 located on an outer periphery of the high-speed rotor assembly with a certain gap therebetween in the circumferential direction and a coil wound on the stator core 2. The first inner rotor device further includes a casing 34 covering an outer periphery of the stator core 2 and fixedly connected to the stator core 2.

The magnetizing ring includes a magnetizing block skeleton 7 and a plurality of magnetizing blocks 30 evenly arranged on the magnetizing block skeleton 7 in the circumferential direction. The magnetizing block 30 is made of a magnetic conductive material. The magnetizing block skeleton 7 is made of a non-magnetically conductive material.

The low-speed rotor assembly includes a low-speed rotor yoke 26 stationary relative to the rotating shaft 13 and low-speed rotor magnet N poles 28 and low-speed rotor magnet S poles 29 fixed on an outer periphery of the low-speed rotor yoke 26. The low-speed rotor magnet N poles 28 and the low-speed rotor magnet S poles 29 are alternately arranged in the circumferential direction. The high-speed rotor assembly includes a high-speed rotor yoke 5 and high-speed rotor magnet N poles 31 and high-speed rotor magnet S poles 32 provided on an inner ring of the high-speed rotor yoke 5. The motor module further includes motor magnet N poles 3 and motor magnet S poles 4 provided on an outer ring of the high-speed rotor yoke 5. The high-speed rotor magnet N poles 31 and the high-speed rotor magnet S poles 32 are alternately arranged in the circumferential direction. The motor magnet N poles 3 and the motor magnet S poles 4 are alternately arranged in the circumferential direction.

Generally, a low-speed rotor have more poles than a high-speed rotor. In this preferred embodiment, the magnetic gear module includes a high-speed rotor assembly, a magnetizing block 30, and a low-speed rotor assembly. Since the low-speed rotor has more poles than the high-speed rotor, the torque can be increased by the action of electromagnetic force. Meanwhile, based on the principle of magnetic field modulation magnetic gears, the magnetizing block 30 can increase the utilization rate of permanent magnets, thrust density, accuracy, and stability. The magnetic gears have built-in overload protection, which has no friction during operation and thus has high reliability, no need for lubrication. The motor magnets and the magnetic gear high-speed rotor magnets are pasted on two sides of the high-speed rotor yoke 5. The motor magnets and the magnetic gear high-speed rotor magnets are synchronized to realize mechanical compound of the motor module and the magnetic gear module. Even if the motor output torque is very small, a high torque can also be obtained through the conversion of the magnetic gear module to meet the robot motion requirements, which greatly reduces the size of the motor and reduces the cost of use. Therefore, this preferred embodiment has the characteristics of low cost, compact structure, high utilization rate of permanent magnets, high speed, high transmission accuracy, and high dynamic response.

The low-speed rotor yoke 26 is fitted on the rotating shaft 13. The holes of the rotating shaft 13 and the low-speed rotor yoke 26 are provided with protrusions, which are thus circumferentially matched by the protrusions. A first shaft spring retainer 9 and a second shaft spring retainer 10 are snapped into two grooves of the rotating shaft 13, respectively, so that the low-speed rotor yoke 26 and the rotating shaft 13 are axially cooperated with each other and thus rotate together.

A plurality of low-speed rotor magnet N poles 28 and a plurality of low-speed rotor magnet S poles 29 are provided. The plurality of low-speed rotor magnet N poles 28 and the plurality of low-speed rotor magnet S poles 29 are pasted on the low-speed rotor yoke 26 by structural adhesive. The low-speed rotor magnet N poles 28 and the low-speed rotor magnet S poles 29 are evenly distributed in the circumferential direction. In addition, the high-speed rotor magnet N poles 31 and the high-speed rotor magnet S poles 32, the magnetizing blocks 30, and the low-speed rotor magnet N poles 28 and the low-speed rotor magnet S poles 29 have a certain gap with each other in a direction perpendicular to the longitudinal axis.

The first inner rotor joint device II further includes a lower end cover 1 and an upper end cover 15 disposed at two opposite ends of the casing 34 in an extending direction of the longitudinal axis. The lower end cover 1 and the upper end cover 15 are fixedly connected to the casing 34. The lower end cover 1 and the upper end cover 15 define a receiving cavity. The low-speed rotor assembly, the high-speed rotor assembly, the magnetizing ring, and the stator core 2 are all received in the receiving cavity.

A lower bearing 6 is provided between the lower end cover 1 and the rotating shaft 13. An upper bearing 25 is provided between the upper end cover 15 and the rotating shaft 13. Specifically, the lower bearing 6 is fitted into the rotating shaft 13. The lower bearing 6 and the rotating shaft 13 are fixedly connected together through overfitting. At the same time, a first circlip 12 is snapped into a corresponding groove of the rotating shaft 13 to axially fix the lower bearing 6. The lower end cover 1 is fitted into an outer ring of the lower bearing 6 and is also connected thereto through overfitting. The bearing 27 is then fitted into an outer ring of the lower end cover 1 through overfitting.

A plurality of magnetizing blocks 30 is evenly inserted into the magnetizing block skeleton 7. A magnetizing block cover 8 is connected to the magnetizing block 30 and the magnetizing block skeleton 7 by bolts. The magnetizing block skeleton 7 is also fitted into the lower end cover 1 through overfitting.

Similarly, a plurality of high-speed rotor magnets N poles 31 and a plurality of high-speed rotor magnet S poles 32 are also pasted on an inner ring of the high-speed rotor yoke 5 through structural glue. A plurality of motor magnet N poles 3 and a plurality of motor magnet S poles 4 are pasted on an outer ring of the high-speed rotor yoke 5 through structural glue and are evenly distributed in the circumferential direction to form a high-speed mover. The high-speed rotor yoke 5 of the high-speed mover is fitted into the bearing 27 through overfitting. The lower end cover 1 is provided with a coil sheath 33. A lead cover 22 is fixedly connected to an outer surface of the casing 34.

The first inner rotor joint device II further includes a grating sheet 21 fixedly connected to the rotating shaft 13 and an encoder 18 fixedly connected to the upper end cover 15. The encoder 18 faces the grating sheet 21. The grating sheet 21 is located on the entire periphery of the rotating shaft 13. The grating sheet 21 is coaxial with the rotating shaft 13. Further, an encoder bracket 16 is provided on the upper end cover 15. The encoder 18 is fixedly connected to the encoder bracket 16 by bolts. A grating sheet seat 23 is fixedly fitted on the rotating shaft 13. A circlip 14 is snapped into a corresponding groove of the rotating shaft 13 to axially fix the grating sheet seat 23. The grating sheet 21 is provided on the grating sheet seat 23. The grating sheet seat 23 is also provided with a grating sheet rubber sleeve 20. The circlip 19 is snapped into a groove of the grating sheet seat 23 to fix the grating sheet 21 and the grating sheet rubber sleeve 20.

The first inner rotor joint device II further includes an encoder housing 17 fixedly provided on the upper end cover 15. The encoder housing 17 and the casing 34 are located on two sides of the upper end cover 15. The encoder housing 17 and the upper end cover 15 define an accommodation space for accommodating the grating sheet 21 and the encoder 18. The encoder housing 17 is fixed on the upper end cover 15 by bolts.

When assembling, the low-speed rotor assembly is first assembled on the rotating shaft 13, and then the magnetizing ring and the high-speed rotor assembly are assembled. Then the second coil sheath 33 is placed on the lower end cover 1. The stator core 2 is placed into an inner ring of the casing 34. Bolt holes are formed on the outer surface of the casing 34. The stator core 2 is stuck inside the casing 34 by tightening external bolts. The casing 34 stuck with the stator core 2 is fitted on the lower end cover 1. Then a first coil sheath 24, the bearing 25, the bearing 11 and the upper end cover 15 are fitted into the aforementioned assembly according to the aforementioned assembly process. The lower end cover 1, the casing 34, and the upper end cover 15 are connected together by bolts. The first coil sheath 24, the casing 34, and the upper end cover 15 are all provided with through holes for outlets. The lead cover 22 is connected to a side of the casing 34 by bolts. Finally, the encoder 18 and the grating sheet 21 are installed. In addition, it is worth noting that all parts should be installed concentrically to ensure stable operation.

Figure 5:
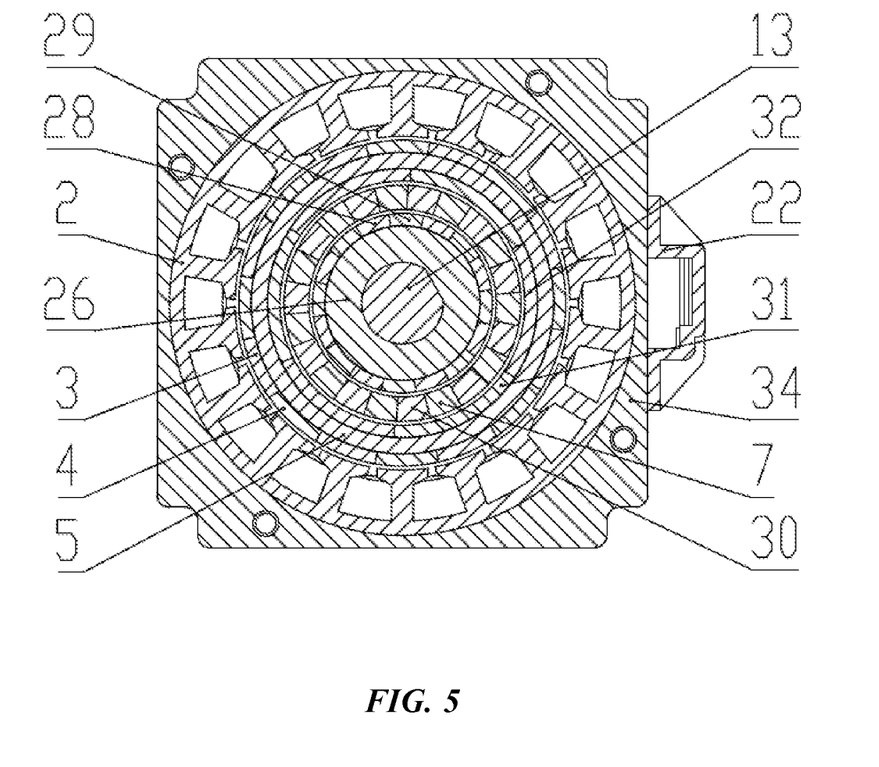
FIG. 5 is a top cross-sectional view of the first inner rotor joint device in FIG. 3.

Further referring to FIG. 5, the motion principle of the magnetic gear compound motor is explained. The high-speed rotor magnet N poles and S poles and the motor magnet N poles and S poles are respectively pasted on the inner and outer rings of the high-speed rotor yoke 5 to form mechanical compound between the motor and the magnetic gear. For the motor, when a three-phase symmetrical current flows through the coil wound on the stator core 2, because the three-phase stator differs in space position by 120, the three-phase stator current generates a rotating magnetic field in the space. The motor magnet N poles and S poles are moved by the electromagnetic force in the rotating magnetic field, which drives the high-speed rotor yoke 5 to rotate. The number of grooves of the stator core 2 and the number of pairs of motor magnet N and S poles can be selected according to requirements. For the magnetic gear, the high-speed rotor magnet N poles and S poles are pasted on the inner ring of the high-speed rotor yoke 5, the high-speed rotor magnet N poles 31 and the high-speed rotor magnet S poles 32 are alternately arranged, the magnets divide the circumference equally, and a total of $N_1$ pairs of poles are provided. The magnetizing blocks 30 and the magnetizing block skeleton 7 also divide the corresponding circumference equally. The magnetizing block 30 can be made of silicon steel sheets and other materials with strong magnetic permeability. $N_3$ magnetizing blocks 30 are provided. The low-speed rotor magnet N poles 28 and the low-speed rotor magnet S poles 29 are alternately arranged, and a total of $N_2$ pairs of poles are provided. Two ends of the high-speed rotor magnet N poles 31 and the high-speed rotor magnet S poles 32, the magnetizing blocks 30, and the low-speed rotor magnet N poles 28 and the low-speed rotor magnet S poles 29 in the direction of the longitudinal axis are flush with each other. That is to say, the upper and lower surfaces of the high-speed rotor magnet N poles and S poles, the magnetizing blocks 30, and the low-speed rotor magnet N poles and S poles are flush with each other, forming coupling of magnetic gear transmission. A small gap is provided among the high-speed rotor magnets, the magnetizing blocks 30, and the low-speed rotor magnets. The magnetizing blocks 30 adjust the magnetic fields generated by the magnets of the two rotors and generate spatial harmonics in the space gap. The adjusted magnetic fields interact with the magnetic field on the other side through the magnetizing blocks 30 to transmit torque and speed. According to the principle of concentric shaft magnetic gear transmission, in order to maximize the thrust density, let:

$$N_3 = N_1 + N_2.$$

In order to maximize the transmitted torque, the speed relationship of each part at this time is:

$$\omega_1 = \frac{N_3}{N_3 - N_2}\omega_3 - \frac{N_2}{N_3 - N_2}\omega_2.$$

Because the magnetizing blocks are fixed, $\omega_3 = 0$, and $$\omega_1 = -\frac{N_2}{N_3 - N_2}\omega_2 = -\frac{N_2}{N_1}\omega_2.$$

That is:

$$\frac{\omega_1}{\omega_2} = -\frac{N_2}{N_1}.$$

It can be seen that the high-speed rotor and the low-speed rotor rotate in opposite directions.

The relationship of torque at this time is:

$$\frac{|T_1|}{|T_2|} = \frac{N_1}{N_2}.$$

$N_1 < N_2$. Therefore, the torque of the outer rotor is increased, but the speed is relatively reduced. Within a time t, the angular relationship between the rotation of the inner and outer rotors is:

$$\frac{\theta_1}{\theta_2} = -\frac{N_2}{N_1}.$$

The parameters in the above formulas are:
$N_1$—the number of pairs of high-speed rotor magnets;
$N_3$—the number of pairs of magnetizing blocks;
$N_2$—the number of pairs of low-speed rotor magnets;
$\omega_1$—rotation speed of high-speed rotor;
$\omega_3$—rotation speed of magnetizing block;
$\omega_2$—rotation speed of low-speed rotor;
$T_1$—torque of high-speed rotor;
$T_2$—torque of low-speed rotor;
$\theta_1$—rotation angle of high-speed rotor within time t; and
$\theta_2$—rotation angle of low-speed rotor within time t.

Figure 6:
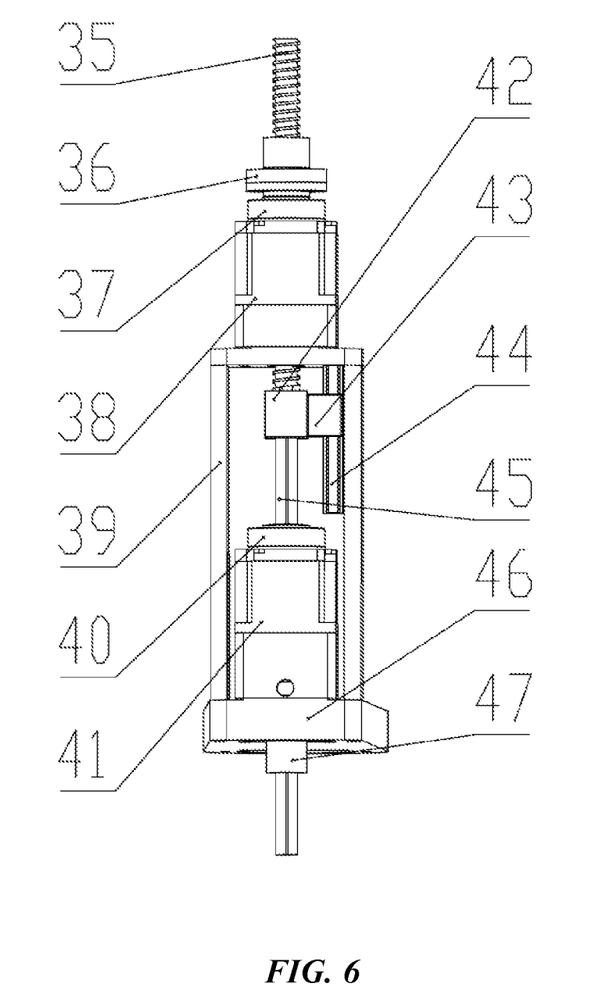
FIG. 6 is a front view of a manipulator in FIG. 1.

Referring to FIG. 6, the mechanical structure of the manipulator will be described. A ball screw spline connector 42 is provided on a slider 43. An upper hollow motor 38 and a lower hollow motor 41 are coaxially arranged. The upper hollow motor 38 has an upper hollow shaft. An upper encoder 37 and a flange nut 36 matched with a ball screw 35 are provided on the upper hollow shaft. The upper encoder 36 is fixed to the upper hollow shaft by set screws. In addition, the ball screw 35 is fitted in the upper hollow shaft. The ball screw 35 is connected to an upper end of the ball screw spline connector 42. The thread angle of the ball screw λ<equivalent friction angle Φv to prevent self-locking and ensure good transmission. In addition, an outer cylinder 47 is fitted on a spline 45 to ensure that the outer cylinder 47 can smoothly drive the spline 45 to rotate. The lower hollow motor 41 has a lower hollow shaft. A lower encoder 40 is provided on the lower hollow shaft. The lower encoder 40 is fixed to the lower hollow rotating shaft by set screws. The spline 45 is fitted in the lower hollow shaft. The spline 45 is provided on the screw spline connector 42. A linear guide 44 is parallel to the upper hollow shaft and the lower hollow shaft. The bottom end of the spline 45 can be connected to an operating mechanism with a flange to complete the gripping of objects and plug-ins. The operating mechanism is a terminal actuator of the manipulator VI, which can be: a clamping jaw for automatic gripping, plug-in, etc.; or a nozzle for patching and wafer cutting; or a soldering machine for soldering, etc. The rotation of the hollow rotor of the upper hollow motor 38 drives a flange nut 38 and the upper encoder 37, so that the flange nut 38 drives the ball screw 35 to move up and down. The upper encoder 37 feeds back a position signal of the upper hollow motor 38. The ball screw 35 drives the spline 45 to move up and down through the ball screw spline connector 42. The hollow shaft of the lower hollow motor 41 drives the outer cylinder 47 and the lower encoder 40. The outer cylinder 47 drives the spline 45 to rotate. The lower encoder 40 feeds back a position signal of the lower hollow motor 41. The upper hollow motor 38, the lower hollow motor 41, the ball screw 35 and the spline 45 are on the same shaft. The ball screw 35 and the spline 45 are directly connected through the hollow shaft to avoid vibration caused by simultaneous operation of the upper hollow motor 38 and the lower hollow motor 41, which realizes decoupling of linear motion and rotary motion. The structure is simple, and the volume of the mechanism is further reduced.

Figure 7:
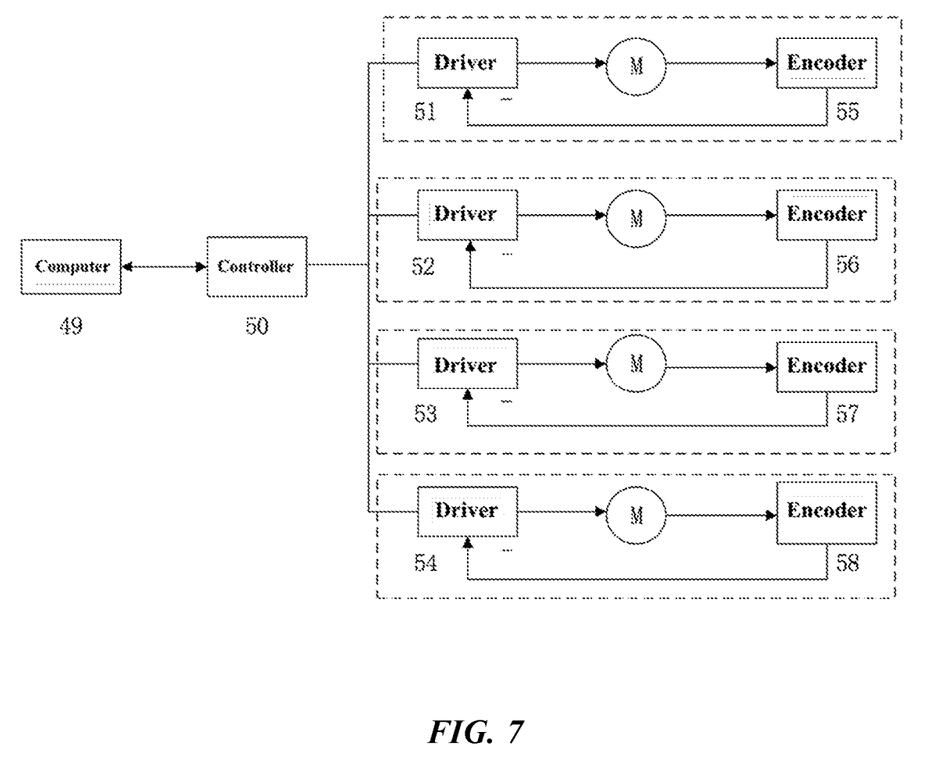
FIG. 7 is a control flowchart of the planar articulated robot in FIG. 1.

Referring to FIG. 7, a control system of the planar articulated robot in this preferred embodiment includes a computer 49, a controller 50, a first motor driver 51, a second motor driver 52, an upper hollow motor driver 53, a lower hollow motor driver 54, a first encoder 55, a second encoder 56, an upper encoder 49, and a lower encoder 57. The computer 49 and the controller 50 are connected by an Ethernet cable to exchange information. The controller 50 is programmed by the computer 49. The controller 50 transmits parameters fed back by the system to the computer 49 for display, in order to issue corresponding pulse signals to the first motor driver 51, the second motor driver 52, the upper hollow motor driver 53 and the lower hollow motor driver 54 according to the program. The controller 50 is connected to the first motor driver 51, the second motor driver 52, the upper hollow motor driver 53 and the lower hollow motor driver 54 through parallel buses, respectively. The controller 50 transmits the calculated number of pulses to the above respective drivers, and the respective drivers will also output corresponding signals to drive the respective motors respectively. The first encoder 55, the second encoder 56, the upper encoder 57, and the lower encoder 58 are connected to the first motor driver 51, the second motor driver 52, the upper hollow motor driver 53, and the lower hollow motor driver 54 through parallel buses, respectively. The first encoder 55, the second encoder 56, the upper encoder 57, and the lower encoder 58 feed back position parameters of the respective motors to the drivers corresponding to the respective motors, thereby determining whether the motors have moved to the corresponding positions. The position signals received by the first encoder 55 and the second encoder 56 are the signal of the low-speed rotor of the magnetic gear compound motor, which cannot be directly fed back. For example, the rotation angle signal θ2 needs to be multiplied by $$-\frac{N_2}{N_1}$$

and converted into a position signal of the high-speed rotor, that is, a position signal of the motor rotor, and then fed back. The respective drivers, motors and encoders constitute a closed control loop, which can ensure the operation accuracy of the motor. Thus, the assembly accuracy is further improved.

It will be apparent to those skilled in the art that the present invention is not limited to the details of the above exemplary embodiments, and that the present invention can be implemented in other specific forms without departing from the spirit or basic characteristics of the present invention. Therefore, regardless of the point of view, the embodiments should be regarded as exemplary and non-limiting, the scope of the present invention is defined by the appended claims rather than the above description, and therefore all changes falling within the meaning and scope of the equivalents of the claims are intended to be included in the present invention. Any reference signs in the claims should not be considered as limiting the claims involved.

In addition, it should be understood that although the description is described in terms of embodiments, not every embodiment only contains an independent technical solution. This narration of the description is for clarity only, and those skilled in the art should take the description as a whole. The technical solutions in the embodiments can also be combined appropriately to form other embodiments that can be understood by those skilled in the art.

The invention claimed is:

1. A planar articulated robot, comprising
a base,
a first inner rotor joint device provided on the base,
a first mechanical arm driven by the first inner rotor joint device, and
a manipulator connected to the first mechanical arm,
wherein the first inner rotor joint device comprises a rotating shaft fixedly connected to the first mechanical arm and extending along a longitudinal axis, a low-speed rotor assembly located on an outer periphery of the rotating shaft, a high-speed rotor assembly located on an outer periphery of the low-speed rotor assembly, a magnetizing ring located between the low-speed rotor assembly and the high-speed rotor assembly in a circumferential direction, a stator core located on an outer periphery of the high-speed rotor assembly with a certain gap therebetween in the circumferential direction, and a casing covering an outer periphery of the stator core and fixedly connected to the stator core, and a coil is wound around the stator core,
wherein the magnetizing ring comprises a magnetizing block skeleton and a plurality of magnetizing blocks uniformly arranged on the magnetizing block skeleton in the circumferential direction, the magnetizing block is made of a magnetically conductive material, and the magnetizing block skeleton is made of a non-magnetically conductive material,
wherein the low-speed rotor assembly comprises a low-speed rotor yoke stationary relative to the rotating shaft and low-speed rotor magnet N poles and low-speed rotor magnet S poles fixed on an outer periphery of the low-speed rotor yoke, the low-speed rotor magnet N poles and the low-speed rotor magnet S poles are alternately arranged in the circumferential direction, the high-speed rotor assembly comprises a high-speed rotor yoke and high-speed rotor magnet N poles and high-speed rotor magnet S poles fixed on an inner ring of the high-speed rotor yoke, motor magnet N poles and motor magnet S poles are provided on an outer ring of the high-speed rotor yoke, the high-speed rotor magnet N poles and the high-speed rotor magnet S poles are alternately arranged in the circumferential direction, and the motor magnet N poles and the motor magnet S poles are alternately arranged in the circumferential direction, and
wherein the high-speed rotor magnet N poles and the high-speed rotor magnet S poles are arranged as $N_1$ pairs, the low-speed rotor magnet N poles and the low-speed rotor magnet S poles are arranged as $N_2$ pairs, and the magnetizing blocks are arranged as $N_3$ blocks, where $N_3=N_1+N_2$.

2. The planar articulated robot according to claim 1, wherein a rotation speed of the high-speed rotor yoke is $\omega_1$ and a rotation speed of the low-speed rotor yoke is $\omega_2$, then $$\frac{\omega_1}{\omega_2} = -\frac{N_2}{N_1}.$$

3. The planar articulated robot according to claim 1, wherein a torque of the high-speed rotor yoke is $T_1$ and a torque of the low-speed rotor yoke is $T_2$, then $$\frac{|T_1|}{|T_2|} = \frac{N_1}{N_2}.$$

4. The planar articulated robot according to claim 1, wherein the high-speed rotor magnet N poles and the high-speed rotor magnet S poles, the magnetizing blocks, the low-speed rotor magnet N poles and the low-speed rotor magnet S poles have a certain gap with each other in a direction perpendicular to the longitudinal axis, and are arranged to be evenly distributed in the circumferential direction.

5. The planar articulated robot according to claim 1, wherein two ends of the high-speed rotor magnet N poles and the high-speed rotor magnet S poles, the magnetizing blocks, the low-speed rotor magnet N poles and the low-speed rotor magnet S poles in the direction of the longitudinal axis are arranged to be flush with each other.

6. The planar articulated robot according to claim 1, further comprising a second mechanical arm disposed between the first mechanical arm and the manipulator and a second inner rotor joint device driving the second mechanical arm to rotate, wherein the second inner rotor joint device is the same as the first inner rotor joint device.

7. The planar articulated robot according to claim 1, wherein the first inner rotor joint device further comprises a lower end cover and an upper end cover provided at two opposite ends of the casing in an extending direction of the longitudinal axis, the lower end cover and the upper end cover are fixedly connected to the casing, the lower end cover and the upper end cover define a receiving cavity, and the low-speed rotor assembly, the high-speed rotor assembly, the magnetizing ring and the stator core are all received in the receiving cavity.

8. The planar articulated robot according to claim 7, wherein a lower bearing is provided between the lower end cover and the rotating shaft, and an upper bearing is provided between the upper end cover and the rotating shaft.

9. The planar articulated robot according to claim 7, wherein the first inner rotor joint device further comprises a grating sheet fixedly connected to the rotating shaft and an encoder fixedly connected to the upper end cover, the encoder faces the grating sheet, the grating sheet is located on the entire periphery of the rotating shaft, and the grating sheet is coaxial with the rotating shaft.

10. The planar articulated robot according to claim 9, wherein the first inner rotor joint device further comprises an encoder housing fixed to the upper end cover, the encoder housing and the casing are located on two sides of the upper end cover, and the encoder housing and the upper end cover define a housing space for housing the grating sheet and the encoder.

* * * * *